April 15, 1930.   H. A. THOMPSON   1,754,728
FILTERING OR LIKE DEVICE
Filed Feb. 14, 1929   2 Sheets-Sheet 2
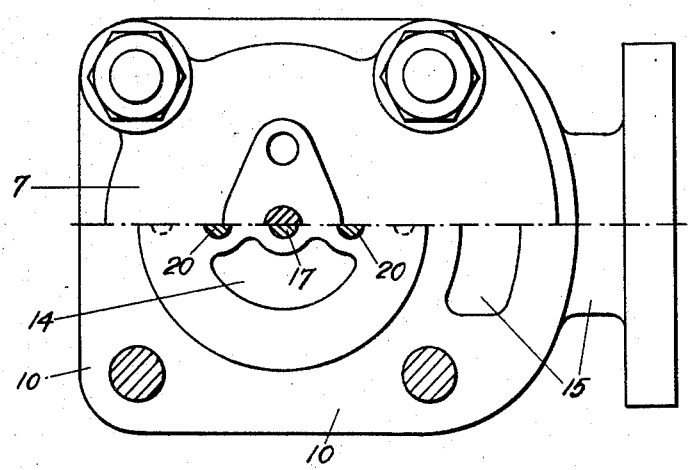
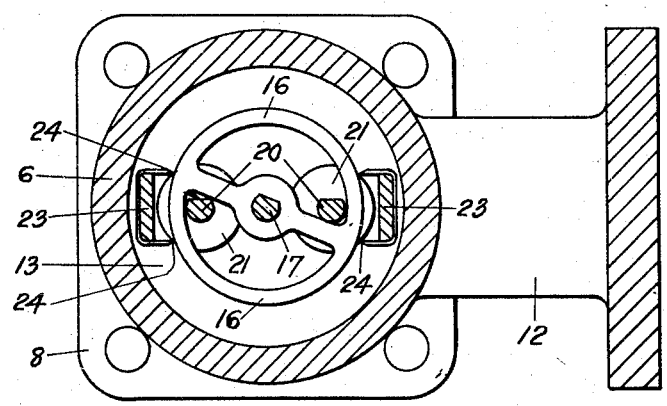
INVENTOR.
H. A. THOMPSON Patented Apr. 15, 1930

1,754,728

UNITED STATES PATENT OFFICE

HERBERT ALEXANDER THOMPSON, OF MORPETH, ENGLAND, ASSIGNOR OF ONE-HALF TO SWINNEY BROTHERS LIMITED, OF MORPETH, ENGLAND, A CORPORATION OF GREAT BRITAIN

FILTERING OR LIKE DEVICE

Application filed February 14, 1929, Serial No. 339,976, and in Great Britain January 17, 1929.

This invention relates to filtering or like devices of the kind wherein the filtering medium consists of spaced co-axial annular laminations adapted for rotation as a whole about their common axis; scraper elements, arranged to extend into the spaces between the laminations, being secured on a spindle parallel to the axis of the laminations, and means interconnecting the spindle and laminations being arranged to provide synchronous rocking or rotation. There may be two or more parallel spindles, preferably disposed symmetrically with respect to the axis of the laminations.

Such filtering devices are described and claimed in the specification accompanying my co-pending application No. 332,076 and the present invention is an improvement in or modification of the invention set forth in this said specification.

The annular laminations may be mounted slidably on a main spindle, but to rotate therewith, and the main spindle geared to the subsidiary spindle or spindles carrying the similarly-mounted scraper elements.

Alternatively, the laminations may be supported without the use of a main spindle and provided with peripheral teeth, either internally or externally, and the scraper elements or their spindles with pinions co-acting with the teeth of the appropriate laminations. The laminations may then be continuously rotated. When two or more sets of scraper elements, secured to symmetrically-disposed parallel spindles are used, whether internally or externally of the laminations, the laminations are automatically maintained co-axial. The employment of a fixed, longitudinal C-like scraper, engaging the lines of intersection of the laminations and scraper elements, will assist this centring. The centring may be further assisted by the provision of longitudinal roller elements adjacent to the laminations against their untoothed edges. When only one set of scraper elements on a common spindle is used, I must use some aligning means, such as the fixed C-like scraper or the roller elements.

Preferably the filtering device is arranged so that the laminations lie horizontally, a sump for receiving rejected refuse being provided therebelow. Two or more filtering devices may be mounted side-by-side and provided with common inlet and outlet passages with valve means therefor, so that the work of filtering may be carried on uninterruptedly while a particular filter is being examined, cleaned or repaired.

When two or more scraper spindles are used, these may be journalled in the end assembly plates for the laminations, and spring washers may be disposed between collars on the spindles and one of the end plates to bias the laminations towards one another. If the C-like scraper is secured in position by means of a bar or rod connected to the end plates, the bar is preferably adjustably connected to one of the end plates to allow of the spring washers operating to maintain the assembly in a state of compression. The same principle applies to the connection of the roller elements, if used.

The present invention consists in providing means whereby the subsidiary spindle or spindles on which the scraper elements are mounted is or are firmly supported in bearings, preferably at each end.

In carrying out the invention one of the assembly plates of the laminations, preferably the top one, which provides a bearing for one end of the scraper spindle(s), may be firmly clamped against rotation. If the other assembly plate is to be used to provide the bearing at the other end of the scraper spindle(s) it may conveniently be keyed or otherwise secured to the main casing so that it is unable to rotate but able to slide axially as necessary in accordance with the compression of the laminated structure. I prefer, however, to prolong the scraper spindle(s) beyond the other end plate and to receive the end of the same in an appropriate socket or sockets provided in one of the cover-plates of the main casing. In this latter case, when the annular laminations are mounted on a main spindle and the subsidiary or scraper spindles are disposed internally of the laminations, the main spindle may be prolonged, for example, at its lower end, and provided with a crank or other stop which, on the rotation of the main spindle, will engage a subsidiary spindle or a fixed part of the casing and thus limit the rocking to-and-fro of the main spindle and prevent a possible fracture.

For a better understanding of the invention, reference should be directed to the following description taken in connection with the accompanying drawings, in which:—

Fig. 2 is a half-sectional plan thereof, the section being taken on the line 2—2 of Fig. 1.

Fig. 3 is a section taken on the line 3—3 of Fig. 1.

Figure 1:
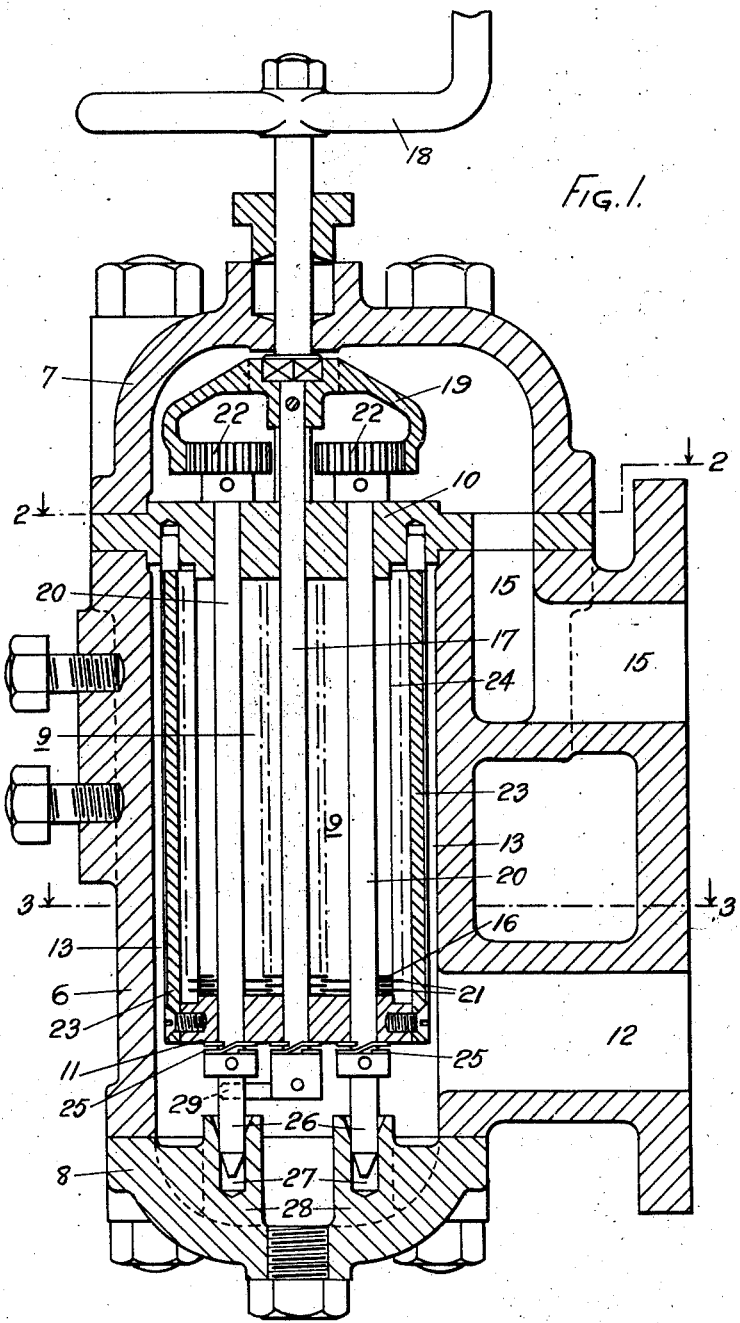
Fig. 1 is a vertical section through a filter according to the invention.

The drawing shows a vertical tubular casing 6 having top and bottom cover-plates 7 and 8 respectively secured thereto by bolts. The laminated structure 9 is disposed within the casing 6 between the top and bottom end plates 10 and 11, respectively.

With this arrangement the flow of liquid during a filtering operation is from the inlet passage 12, to the annular space 13 between the laminated structure 9 and the casing 6, radially inward through the laminations, and up through the interior of the laminations through holes 14 in the top end plate 10 to the outlet passage 15.

In this arrangement the annular laminations 16, 16 are slidably mounted on the main spindle 17 to rotate therewith. The handle 18 is provided for rotating or rocking the main spindle, which has secured to it the internally-toothed pinion 19. The main spindle is journalled in the top and bottom end plates 10 and 11.

There are here shown two subsidiary spindles 20, 20 disposed on opposite sides of the main spindle and extending through the top and bottom end plates 10 and 11. These spindles carry the scraper discs 21, 21 as above described, which are interposed between the annular laminations 16, 16. To the upper ends of the subsidiary spindles are secured the pinions 22, 22 each gearing with the gear wheel 19.

Loosely carried by the end plates 10 and 11 are the C-like fixed scraper elements 23, 23 having knife-like edges 24, 24 directed towards the edges of the scraper discs 21, 21 where they emerge from the annular laminations 16, 16.

The two end plates are biased towards one another to subject the laminated structure 9 to a suitable compression by means of the spring washers 25, 25.

In the present instance the top end plate 10 is shown as being firmly clamped between the top cover-plate 7 and the main body of the casing 6, as by means of the bolts by which the top cover-plate is secured. The clamping of the top end plate 10 in this manner provides a firm bearing for the upper ends of the subsidiary spindles 20, 20. The lower end plate 11 is not firmly anchored, and therefore the spindles 20, 20 are prolonged at 26, 26 to take into sockets 27, 27 in shoulders or ribs 28, 28 provided in the bottom cover-plate 8, so that the subsidiary spindles and the whole structure 9 are firmly held against lateral movement; journalled at each end.

In the arrangement illustrated the subsidiary spindles pass internally of the laminations, and these latter are mounted on the main spindle, so that the main spindle can be rocked to-and-fro but not fully rotated. 29 represents a stop mounted on the lower end of the main spindle, the same engaging the extensions 26, 26 as the main spindle is rocked to-and-fro to its maximum extent.

The manner in which the filter is operated, and in which the present invention can be applied to duplex, outflow, and other filters of the kind aforesaid, will readily be understood, it is believed, from a consideration of the specification of United States Patent #1,719,346.

What I claim as my invention, and desire to secure by Letters Patent is:—

1. In a filter device, the combination of a plurality of annular laminations spaced along a main spindle, said laminations being movable axially of but rotatable with said main spindle, a subsidiary parallel spindle mounted internally of said laminations in fixed bearings, scraper elements which are movable axially on said subsidiary spindle but rotatable therewith, said scraper elements being arranged to extend into the spaces between said laminations, means applying a suitable tension to the assembly of laminations and scraper elements, and means interconnecting said spindles to provide synchronous rotational movement thereof.

2. In a filter device, the combination of a plurality of annular laminations spaced along and rotatable with a main spindle, said laminations forming a cylindrical chamber provided with peripheral openings, means closing one end of said chamber, a subsidiary parallel spindle mounted internally of said laminations in fixed bearings, scraper discs carried on the subsidiary spindle and rotatable therewith, said scraper discs, extending into the peripheral openings between said laminations, and means interconnecting said spindles to provide synchronous rotational movement thereof.

3. In a filter device, the combination of a plurality of annular laminations spaced along and rotatable with a main spindle, said laminations forming a cylindrical chamber provided with openings, means closing one end of said chamber, subsidiary parallel spindles mounted internally of said laminations in fixed bearings, scraper discs carried on the subsidiary spindles, said scraper discs extending into the spaces between said laminations, means interconnecting said spindles to provide synchronous rotational movement thereof, and plates at the ends of the assembly of laminations and scraper elements through which said spindles extend, the plate nearest to said interconnecting means being fixed, and fixed means at the other end of said assembly in which said subsidiary spindles are journalled.

4. In a filter, the combination of an outer stationary casing, an end closure therefor, a stationary slotted plate secured transversely within said casing adjacent said end closure, a vertically disposed shaft journalled centrally in the aforesaid end closure and the aforesaid stationary plate, a plurality of spindles journalled in said stationary plate, an unsecured plate through which the centrally disposed shaft and spindles project, collars at the respective ends of the spindles, spring-washers interposed between the collars at one end of each of the spindles and the unsecured plate, a spring washer between a collar on the centrally disposed spindle and unsecured plate, an end closure adjacent said unsecured plate having sockets to receive projecting ends of said spindles, non-revoluble scrapers firmly attached to said unsecured plate but movable lengthwise in the aforesaid stationary plate, an arm projecting from said collar on the centrally disposed shaft to constitute a stop, laminations on said centrally disposed shaft, between said stationary and unsecured plates, scraper discs on said spindles between said stationary and unsecured plates and means for imparting motion in a rotary direction to the centrally disposed shaft and adjacent spindles.

HERBERT ALEXANDER THOMPSON.